(12) United States Patent
Flammer et al.

(10) Patent No.: US 8,444,205 B2
(45) Date of Patent: May 21, 2013

(54) MOLDED COMPONENT AND SEALING SYSTEM FOR A MOTOR VEHICLE WINDOW

(75) Inventors: Eberhard Flammer, Biedenkopf (DE); Wolfgang Platt, Biedenkopf (DE)

(73) Assignee: Elkamet Kunststofftechnik GmbH, Biedenkopf (DE)

( * ) Notice: Subject to any disclaimer, the term of this patent is extended or adjusted under 35 U.S.C. 154(b) by 0 days.

(21) Appl. No.: 13/133,551

(22) PCT Filed: Jul. 23, 2009

(86) PCT No.: PCT/DE2009/001028
§ 371 (c)(1), (2), (4) Date: Aug. 15, 2011

(87) PCT Pub. No.: WO2010/066216
PCT Pub. Date: Jun. 17, 2010

(65) Prior Publication Data
US 2011/0285177 A1    Nov. 24, 2011

(30) Foreign Application Priority Data
Dec. 9, 2008   (DE) .................... 20 2008 016 217 U

(51) Int. Cl.
B60J 1/02         (2006.01)
(52) U.S. Cl.
USPC ............................................ 296/93; 296/201
(58) Field of Classification Search
USPC .......................... 296/93, 84.1, 201
See application file for complete search history.

(56) References Cited

U.S. PATENT DOCUMENTS

| 3,363,364 A | 1/1968 | Cadiou |
| 6,769,700 B2 | 8/2004 | Ortmuller et al. |
| 7,806,455 B2 * | 10/2010 | Polke .............................. 296/93 |

FOREIGN PATENT DOCUMENTS

| DE | 200 08 555 U1 | 8/2000 |
| DE | 19959602 A1 | 6/2001 |
| DE | 10122637 A1 | 10/2002 |
| EP | 0249560 A1 | 12/1987 |
| EP | 1361098 A1 | 11/2003 |
| EP | 1 571 069 A1 | 9/2005 |
| EP | 1634753 A1 | 3/2006 |
| EP | 1 724 141 A1 | 11/2006 |
| FR | 2 817 302 A1 | 5/2002 |
| WO | WO-2006/002891 A2 | 1/2006 |

OTHER PUBLICATIONS

International Search Report for Application No. PCT/DE2009/001028, dated Dec. 14, 2009.

* cited by examiner

*Primary Examiner* — Joseph Pape
(74) *Attorney, Agent, or Firm* — Leydig, Voit & Mayer, Ltd.

(57) ABSTRACT

A molded component to connect a motor vehicle window with a water box includes a first segment affixable to the vehicle window and a second segment having a detent cavity bounded by a resilient leg and configured to receive a rib of the water box in an insertion direction so as to detachably affix the water box in a frictionally and/or geometrically interlocking manner in the detent cavity. A detent element projects into the detent cavity at an acute angle relative to the insertion direction such that the resilient leg is elastically deformed to a greater extent during an extraction of the rib of the water box from the detent cavity than during an insertion of the rib of the water box into the detent cavity. This facilitates the insertion and presents a greater resistance to the extraction of the rib from the detent cavity.

18 Claims, 3 Drawing Sheets

MOLDED COMPONENT AND SEALING SYSTEM FOR A MOTOR VEHICLE WINDOW

CROSS-REFERENCE TO RELATED APPLICATIONS

This is the U.S. national phase of International Patent Application No. PCT/DE2009/001028, filed Jul. 23, 2009, which claims the benefit of priority of German Patent Application No. DE 2008 016 217.3, filed Dec. 9, 2008, the entire contents of each of which are hereby expressly incorporated herein by reference.

FIELD OF THE DISCLOSURE

The present disclosure relates to a molded component made by extrusion, injection or the like, which connects a motor vehicle pane such as a window/windshield to a water box.

BACKGROUND

In such motor vehicles a water box is configured below the vehicle window, for instance the windshield, to collect water running down the window and draining it sideways. Illustratively an extrusion-molded component or "shape"/"section" is used to affix the water box to the lower edge of the vehicle window and to seal it, this component being firmly affixed edge-wise to said vehicle window and being fitted with an insertion groove to detachably receive said water box.

To preclude generating an offset or edge in the transition zone of the molded component, the German patent document DE 200 08 555 U1 discloses a sealing system for motor vehicle windows that comprises a cross-sectionally hook-shaped component bonded to the lower edge of said motor vehicle window. The molded component comprises a resilient leg which together with a wedging rib constitutes an outwardly open detent cavity. This cavity receives the water box which is fitted on its back side with a detent rib. A sealing lip is constituted on the wedging rib and may be fitted in-between the lower window edge and the upper water box lid and in the installed position terminates flush with the outer surfaces of the water box and the motor vehicle window. A buffering strip made of a relatively softer material is configured below said insertion groove and allows the sealing system to rest against the motor vehicle body.

It is necessary to support the molded component on the vehicle body because the insertion of the water box into said component must overcome a comparatively high impedance. This impedance in turn is required to reliably affix said water box to said component rather than incurring accidental detachment during motion or other applied mechanical or thermal stresses. On the other hand the water box must frequently be detached from the vehicle window and be reassembled to it, for instance when exchanging a filter.

Relatively high forces are always applied when installing the water box and they directly act on the bonding between the molded component and the vehicle window. If said component were not resting against the vehicle body, or it cannot access the body, there is danger that said component stressed by the installation will detach off said window.

The known molded components incur the further drawback that by resting on the vehicle body they may generate clatter, in particular when the compliant supports lose their elasticity over time.

GENERAL DESCRIPTION

The objective of the present disclosure is remedying the aforementioned and other drawbacks of the state of the art and to create a molded component to connect a vehicle window pane and a water box, being of economic and simple manufacture and assuring both simple and quick water box installation, without unduly stressing the connection between said component and said vehicle window. Nevertheless the water box assembled to said component shall be permanently and firmly affixed and also withstand substantial loads in problem-free manner.

Regarding a molded component connecting a vehicle window and a water box and comprising a first segment affixable to said window, further a second segment forming a detent cavity allowing detachable affixation of the water box, said water box being fitted with a rib that can be affixed frictionally and/or in geometrically interlocking manner in said cavity, said first segment by its edge at least partly enclosing said window, the present disclosure provides at least one detent element which is designed in a manner to facilitate the insertion of the water box rib into the detent cavity in a first direction whereas pulling the rib out of this detent cavity in the opposite direction is made comparatively more difficult.

This approach of the present disclosure makes it possible to install the water box quickly and conveniently because, compared to conventional molded components, the rib of the present disclosure can be inserted with substantially reduced resistance respective needed force into the associated detent cavity. Accordingly substantially lower loads are applied to said component and to its bond to the vehicle window, and therefore said component no long may be unintentionally detached from the window, even after repeated disassemblies and re-assemblies of the water box. Again, an elaborate support of the said component by the vehicle body no longer is needed, and therefore manufacturing and assembly costs are reduced. As a result, too, clatter from relative motion between the component and the vehicle body is eliminated.

On the other hand, extracting the said rib is made much more difficult by the disclosure's design of the detent element, and accordingly the water box is firmly affixed following installation in the molded component. Even when subjected to high mechanical or thermal loads, the water box cannot detach off said component or even the vehicle; in this way high operational reliability is attained. The entire configuration offers simple design and is exceedingly stable.

Advantageously the assembly and disassembly loads are controlled in a manner that the, respectively each detent element is configured at an angle to the direction of assembly. Illustratively, when inserting the water box rib into the detent cavity, the detent element is easily forced sideways or bent, whereas, when taking out the water box. the rib must impact this element before releasing it.

By means of the angular position of the detent element relative to the direction of assembly, the, resp. each detent element constitutes a barbed hook of the water box rib inserted into the detent cavity, as a result of which said water box can only be disassembled from the molded component by overcoming said barb at a predetermined force, for instance for purposes of maintenance or repairing parts configured underneath. In the opposite direction, on the other hand the impedance presented by said barb when the rib is inserted into the detent cavity is comparatively easily overcome and as a result the molded component and its connection to the vehicle window are little loaded.

Advantageously moreover the, resp. each detent element shall be at least elastically deformable. Such an element shall readily yield when the rib is inserted into the detent cavity whereas moving the detent element out of the way when extracting the rib out of the molded component is made considerably more difficult in spite of said elasticity, for instance the detent element requiring being bumped into before it releases said rib. To enhance the functionality of the barb, the resp. each detent element may be fitted at its free longitudinal edge with a curved or beak edge which, depending on its design, rests against the water box rib and/or the molded component.

In one significant embodiment mode of the present disclosure, the, resp., each detent element is configured within the detent cavity and can be made to engage the water box rib frictionally or in geometrically interlocking manner. The most diverse designs are applicable in this respect. For instance the detent element may be configured at an angle to the direction of assembly at a support rib or at a protrusion of the molded component and/or at a resilient leg of the detent cavity.

Further advantages are attained when the detent cavity has or forms an engagement aperture, the resp. each detent element at least partly extending into said engagement aperture. In this way the water box rib when being inserted into the detent cavity immediately contacts the detent element which initially is pushed inward by the rib and thereby the water box can be installed without having to overcome large forces. On the other hand, following insertion of the rib into the detent cavity, said detent element engages said rib. This detent element also constitutes a barb on account of its angular position and may be forced aside only after a substantial force has been overcome. In spite of having been easily installed, the water box no longer can accidentally detach off the molded component.

A particular design—whereby the curved respectively the beak edge of the resp. each detent element rests against the water box rib when this water box is in its installed position—offers enhanced positional stability. For that purpose said rib may be fitted with an undercut, an offset or the like.

Additionally or alternatively, the resp. each detent element may be configured at the water box rib, in which case the detent element may be made to engage the molded component frictionally and/or in geometrically interlocking manner. This particular design also assures simple and quick connection between the detent element and the molded component without thereby loading the connection between the molded component and the motor vehicle window during assembly. At the same time the water box mounted on the molded component is affixed in place so firmly that the overall assembly is able to easily withstand even substantially larger loads while nevertheless allowing taking off the water box without thereby damaging the molded component.

In this embodiment mode, the detent element function as a barb relative to the molded component, this barb significantly reducing the forces to be overcome at assembly while nevertheless firmly fixing into place the installed water box. The curved or beak edge of the resp. each detent element in the process rests against the support rib, the protrusion or the resilient leg which for this purpose may be fitted with an undercut, an offset or the like.

The detent cavity of the molded component is constituted by a resilient leg and the first segment, the free end of said leg and the protrusion bounding an engagement aperture. The resilient leg substantially may be L-shaped, U-shaped or hook-like. Additionally the free end of said resilient leg may be fitted within the detent cavity with an undercut which may be engaged by the water box rib or the detent element.

Accordingly the water box rib when in its locked position is always firmly enclosed by the outwardly projecting resilient leg, the protrusion constituting a clamping element for the rib. An additional or complementary detent function may be implemented by an undercut at the protrusion within the detent cavity, for instance for the water box rib or the detent element.

Also, all parts may be integral. This feature makes possible the most diverse designs, the individual parts being single or multiple elements.

Preferably the detent element is made of a substantially compliant material, other portions of the molded component and the protrusion being made of a stiffer but nevertheless elastic material. The individual parts or the entire molded component however may also be made of a material combination, in particular designed as a composite structure made of soft and hard materials. Illustratively the sealing lip may be externally compliant but stiff inside; in particular it may be internally solid or hollow and stiff while externally compliant. Other variations also may be used. The detent element may be externally compliant while made of a harder but still resilient material inside. Again said detent element may assume diverse cross-sectional shapes, for instance being rectangular, oval or concave. Moreover it may be shaped individually, matching the water box rib, and be at least portion-wise a hollow cross-sectional contour. The protrusion of the molded component may be substantially wedge-shaped, stepped, T-shaped or U-shaped. Further shapes are also applicable.

The first and/or the second said segments are fitted at least portion-wise with an elastic stiffening insert. As a result the entire molded component is resistant to high loads and is permanently dimensionally stable.

As regards manufacturing, advantageously said first segment and/or the second segment shall be in the form of an extruded molded part. This feature allows reducing manufacturing costs.

In one advantageous design of the present disclosure, the inside space of the first segment is fitted with a sealing lip. Following installation of the molded component to the motor vehicle window, said sealing lip rests against said window while being enclosed at least in part by the first segment. This feature assures both reliably holding said window in place in the molded component and preventing moisture penetration.

A further sealing lip may be configured at the first segment of the molded component. Said second sealing Hp then is situated between the water box and the vehicle window and precludes moisture from entering this space.

The overall sealing system is intended for vehicle windows, in particular for the lower zone of a motor vehicle windshield. Said system is constituted by the vehicle window, by the molded component mounted to it and by the affixable water box.

The molded component allows installing the water box quickly and simply and absent substantial loads/forces, as a result of which the connection between said component and the vehicle window shall not be stressed even after repeated water box installations. Simultaneously the water box in its installed position is held in place in the molded component in frictionally and geometrically interlocking manner, attaining thereby a durably firm connection withstanding even substantial mechanical and thermal loads. Nevertheless the water box may be taken off again, for instance when changing a pollen filter, even though a larger force must then be applied than for installation.

BRIEF DESCRIPTION OF DRAWINGS

Further features, details and advantages of the present disclosure are defined in the appended claims and in the description below of illustrative embodiment modes shown in the appended drawings.

DETAILED DESCRIPTION

Figure 1:
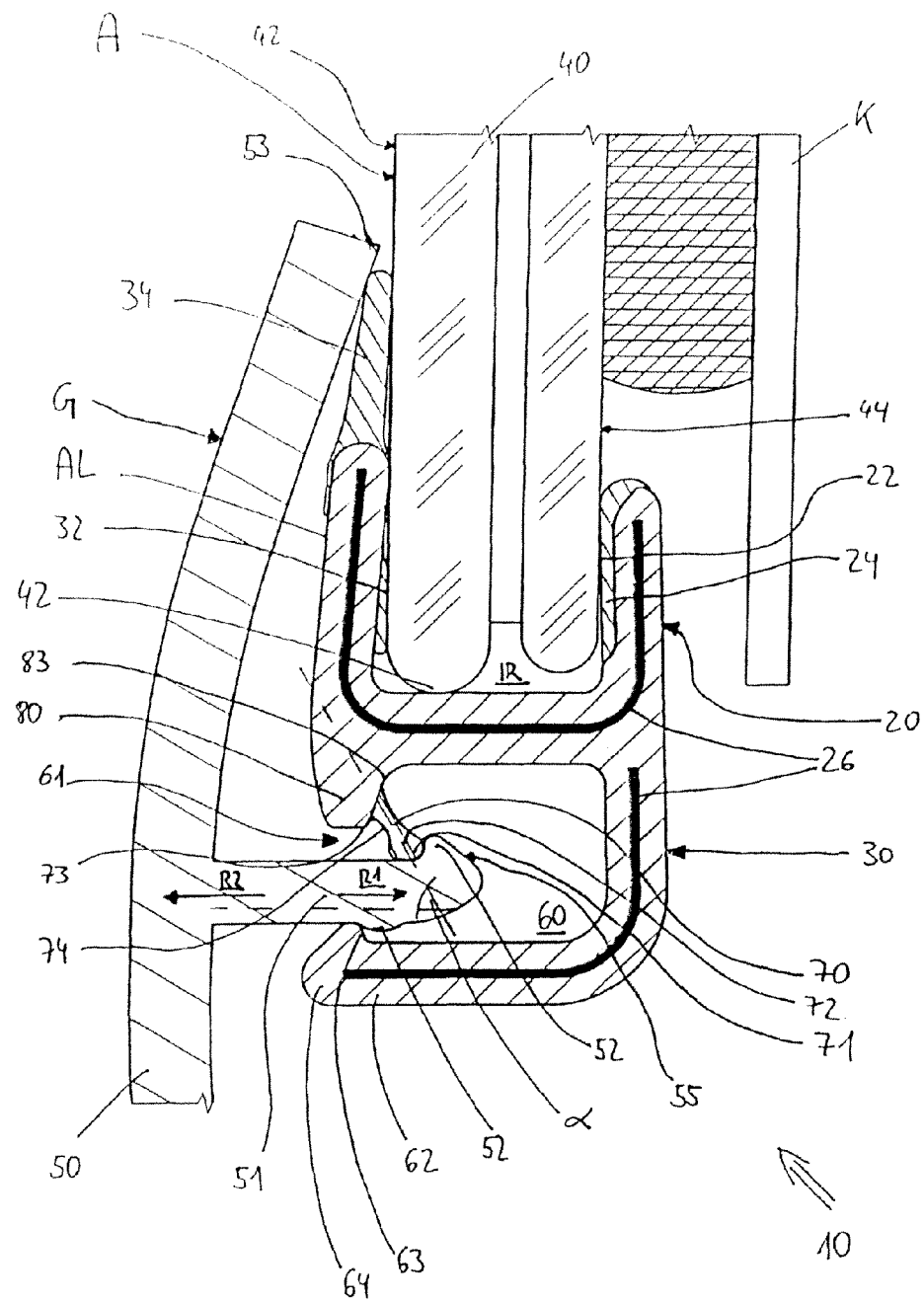
FIG. 1 is a schematic sectional view of an installed sealing system comprising a molded component and fitted with sealing lips.

The molded component denoted overall by 10 in FIG. 1 serves to connect a motor vehicle window 40 with a water box 50. Illustratively the motor vehicle window 40 is a windshield made of a compound glass installed into a body K of (an omitted) passenger car. The water box 50 in general is made of plastic and adjoins by an upper edge 53 the outer edge 42 of the windshield 40 and drains water flowing down said windshield to the outside.

Preferably the molded component 10 is an extruded component of a length corresponding to the said windshield's width respectively to the width of the water box. Said component is made of one or more plastics each of an appropriate hardness, for instance polypropylene (PP), polyvinylchloride (PVC), acrylonitrile-butadiene-styrene copolymers (ABS) or the like and/or of combinations thereof. Elastomers also may be used, or rubber materials such as EPDM.

A first segment 20 of the molded component 10 comprises a surface 22 which shall rest against the motor vehicle window 40. A soft coating 24 is configured on said surface 22. This soft coating 24 may be vulcanized onto the first segment 20 or be bonded to it. By means of the soft coating 24, the molded component 10 is pressed along the window edge 42 against the back side 44 of the vehicle window 40. The coefficient of friction of the soft coating 24 is higher than those of the remaining parts of the component 10. As a result, the component 10 is reliably clamped against the vehicle window 40. It may also be optionally and additionally bonded to said window.

The molded component 10 comprises also a second segment 30 fitted with a detent cavity 60 serving to detachably affix the water box 50 which is fitted on its back side with an entering resp. projecting rib 51 that is affixable in factional and/or geometrically interlocking manner in said cavity 60. FIG. 1 shows that the water box rib 51 runs in a direction R1 approximately perpendicular to the outer surface G of the water box 50 resp. to the outer surface A of the front window 40. The configuration of the motor vehicle window 40, the molded component 10 and the water box 50 moreover is designed in a manner that the resilient rib 51 of the water box 50 can be inserted in the direction R1 into the detent cavity 60 of the component 10 and is detachable from it in the opposite direction R2.

The detent cavity 60 is bounded by a substantially L-shaped, U-shaped or hook-like resilient leg 62 and a protrusion 80 that is constituted between the first segment 20 and the second segment 30 of the component 10. The free end 64 of the resilient leg 62 and the protrusion 80 form an engagement aperture 61 for the rib 51 of the water box 50.

At its free end 64 and within the detent cavity 60, the resilient leg 62 is fitted with an undercut 63. In the installed position of the water box 50, said undercut 63 engages from behind a beak edge 52 constituted on the rib 51 that, as a result, is always affixed frictionally and/or in geometrically interlocking manner in the detent cavity 60 of the component 10. The beak edge 52 and the free end 64 of the resilient leg 62 are fitted with (not specifically denoted) bevels to more easily insert the rib 51 into the detent cavity 60.

To assure both simple and quick installation of the water box 50 without thereby stressing the clamping connection between the molded component 10 and the vehicle window 40, a detent element 70 in the form of a rib running in the longitudinal direction of the component 10 is used inside the detent cavity 60. Said detent element 70 is at least partly elastically deforming, being made of a softly compliant substance such as a thermoplastic elastomer (TPE, EPDM), a foam rubber or another suitable product and designed in a way that the rib 51 of the water box 50 can be inserted in the direction R1 into the detent cavity 60 while encountering a relatively low impedance, whereas extracting the rib 51 from the detent cavity 60 in the opposite direction R2 is made significantly more difficult.

As shown by FIG. 1, the detent element 70 is configured within the detent cavity 60 at an angle α to the direction R1, R2 and hence at an acute angle relative to the rib 51 of the water box 50. Said detent element 70 moreover enters at least partly the engagement aperture 61 of the detent cavity 60 within which it may engage frictionally and/or in geometrically interlocking manner the rib 51 of the water box 50, whereby said box in its installed position is durably firmly but still detachably affixed.

To enhance the above feature, the detent element 70 is fitted at its free longitudinal edge 72 with a curved or beak edge 71 whereas the rib 51 of the water box 50 is fitted with an associated beak edge 52 resp. an undercut. Due to this design, the free end of the detent element 70 resp. its curved or beak edge 71 can rest, in the installed position of said water box, on the latter's rib 51 also running in the longitudinal direction of the molded component 10, thereby assuring durable, firm locking.

As also shown in FIG. 1, the detent element 70 is fixed in position at the protrusion 80, namely in the zone of the undercut 83. Between the link-up region 73 at the protrusion 80 and the terminal curved or beak edge 71, said detent element 70 comprises a tapered portion 74, resulting in a somewhat concave cross-sectional surface. This design allows the detent element 70 to move out of the way laterally or transversely to its longitudinal direction as soon as the rib 51 of the water box 50 is inserted into the detent cavity 60. To enhance this effect, the rib 51 is fitted terminally with a bevel 55 that is able to laterally displace the detent element 70. Depending on the desired force of application to insert the rib 51 into the detent cavity 60, the cross-section of the detent element may also be wedge-shaped or parallelepipedic.

Preferably the detent element 70 is firmly bonded to the protrusion 80. However it may also be integral with it. FIG. 1 further shows a seal 32 between the outer side A of the motor vehicle window 40 and the first segment 20 of the molded component 10. Said seal 32 seals the inner space JR of said molded component against moisture and additionally reliably secures the molded component 10 against the vehicle window 40. A further seal 34 is configured on that side of the first segment 20 of said molded component which faces the water box 50. This seal 34 prevents moisture from running from the outer side A of the vehicle window 40 into the inside space IR. It also assures that the water box 50 shall not directly rest against said window 40. Accordingly vibrational noise is precluded.

Figure 2:
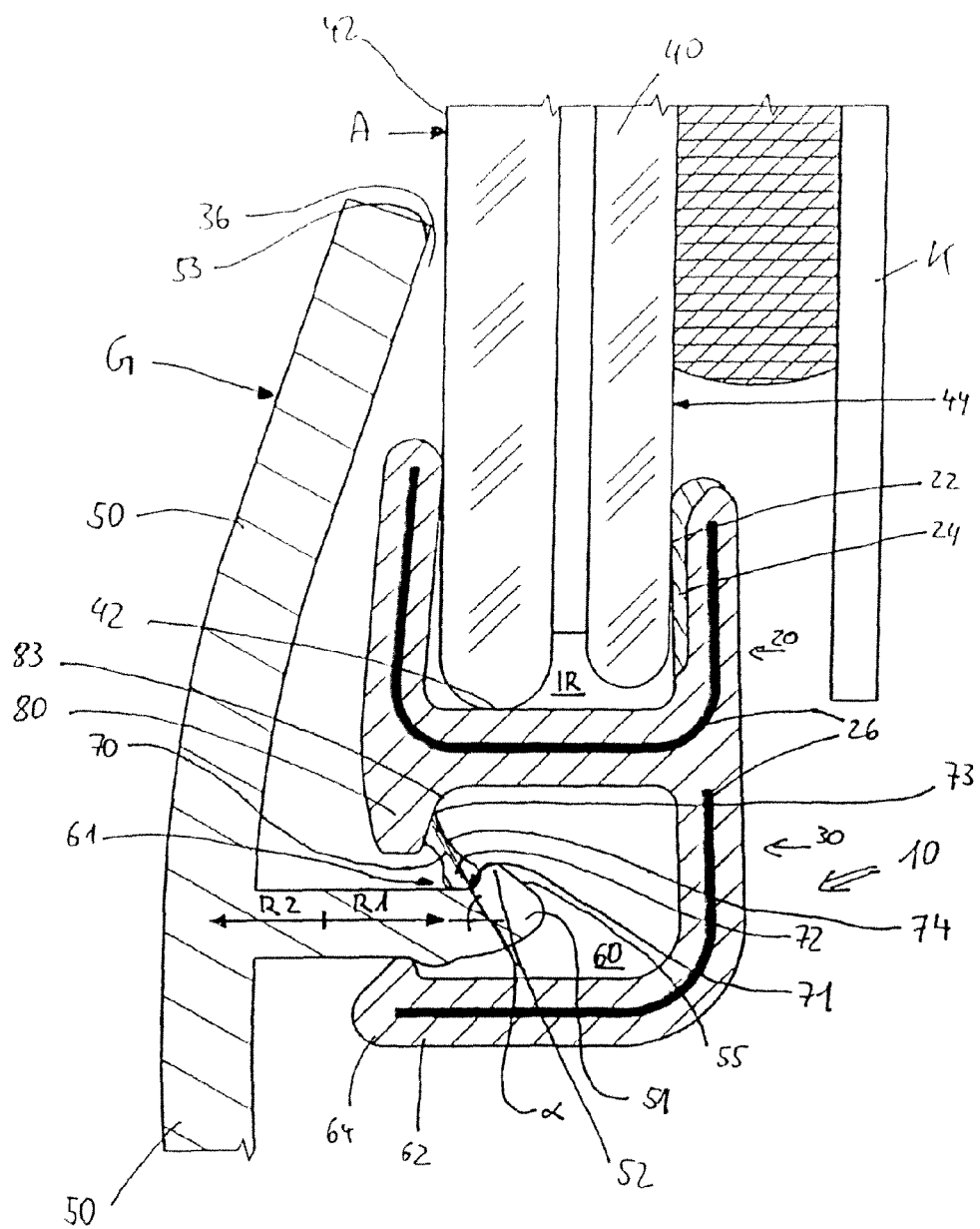
FIG. 2 is a schematic sectional view of an installed sealing system with a molded component lacking sealing lips.

FIG. 2 shows a sealing system of the present disclosure which consists of a vehicle window 40, a molded component 10 affixed to said window and a water box 50 in the assembled state but absent the seals 32, 34. FIG. 2 clearly shows the gap 36 remaining between the vehicle window 40 and the water box 50. This is an economically optimal design for some kinds of vehicles. Alternatively, the molded component 10 also can be bonded to the vehicle window 40. Alternatively again, such a design also may be used for water boxes already fitted with their own seals 34 (in the form of a rubber lip). The rib 51 of the water box 50 in this instance too is locked in said molded component's 10 detent cavity 60.

Figure 3:
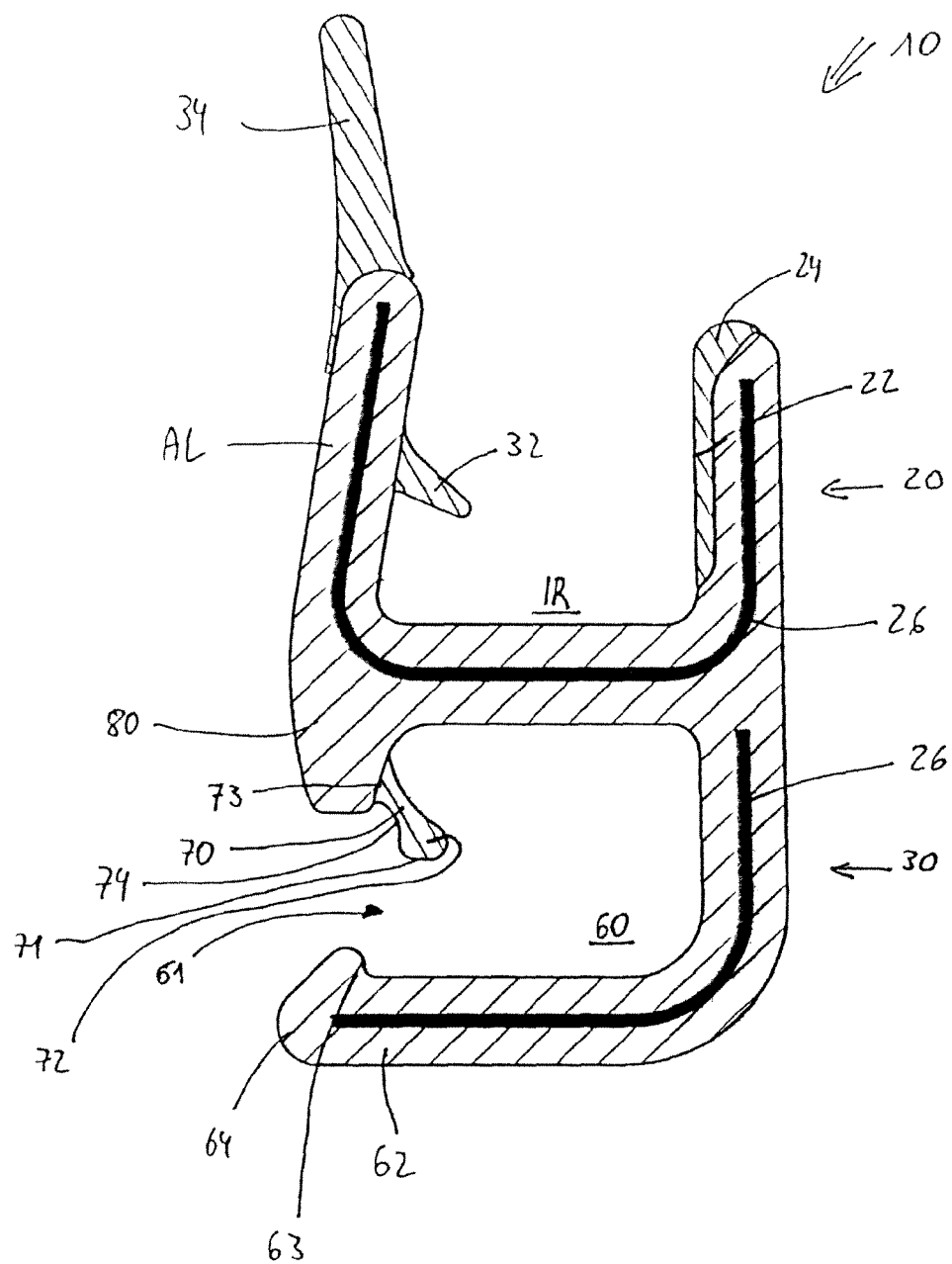
FIG. 3 is a schematic sectional view of the sealing system of FIG. 1 before assembling the water box and the motor vehicle window.

FIG. 3 shows the sealing system consisting of the vehicle window 40, the molded component 10 affixed thereto, and the water box 50 of FIG. 1 in the yet uninstalled state. However it also clearly shows that the seal 32 extends into said inside space IR when the said window 40 is uninstalled. When the vehicle window 40 is inserted, it shall be kept in the first segment 20 between the seal 32 and the soft coating 24. The soft coat 24 additionally also may be treated with an adhesive. The externally situated seal 34 preferably is vulcanized onto the outer wing AL of the molded component 10, or bonded to or integral with it.

All features and advantages explicit and implicit in the claims, specification and drawings, inclusive design particulars, spatial configurations and procedural steps, may be construed being inventive per se as well as in arbitrary combinations.

The invention claimed is:

1. A molded component to connect a motor vehicle window with a water box, the molded component comprising:
   a first segment affixable to the vehicle window;
   a second segment having a detent cavity bounded by a resilient leg and configured to receive a rib of the water box in an insertion direction so as to detachably affix the water box in at least one of a frictionally and a geometrically interlocking manner in the detent cavity; and
   at least one detent element that projects into the detent cavity at an acute angle relative to the insertion direction such that the resilient leg is elastically deformed to a greater extent during an extraction of the rib of the water box from the detent cavity than during an insertion of the rib of the water box into the detent cavity so as to facilitate inserting the rib of the water box into the detent cavity in the insertion direction and present a greater resistance to extracting the rib from the detent cavity in an extraction direction opposite the insertion direction.

2. The molded component as claimed in claim 1, wherein the at least one detent element constitutes a barb.

3. The molded component as claimed in claim 1, wherein an engagement aperture into the detent cavity is delimited in the insertion direction by a free end of the resilient leg and a protrusion disposed between the first and second segments, the at least one detent element projecting into the detent cavity from one of the resilient leg and an undercut disposed behind the protrusion in the insertion direction.

4. The molded component as claimed in claim 1, wherein the at least one detent element projects into the detent cavity from a link-up region to a free longitudinal edge and increases in cross-section from a tapered zone to a curved or beak edge at the free longitudinal edge that is configured to engage with the rib of the water box in the at least one of a frictionally and geometrically interlocking manner.

5. The molded component as claimed in claim 4, wherein, in an installed position of the water box, the curved or beak edge of the at least one detent element is configured to rest in the geometrically interlocking manner in an undercut of the rib of the water box.

6. The molded component as claimed in claim 1, wherein at least one of the first segment and the second segment include a reinforcing insert.

7. The molded component as claimed in claim 1, wherein at least one of the first segment and the second segment is formed by extrusion.

8. The molded component as claimed in claim 1, wherein the first segment has a U-shape so as to be affixable to a bottom of the vehicle window from an outer surface around the bottom to a back side.

9. The molded component as claimed in claim 1, wherein the first segment includes a seal configured to be disposed between an outer surface of the vehicle window and the water box in an installed state of the water box.

10. A sealing system for a transition zone of a motor vehicle window, comprising:
    a water box having a rib; and
    a molded component comprising:
       a first segment affixable to the vehicle window; and
       a second segment having a detent cavity bounded by a resilient leg and configured to receive a rib of the water box in an insertion direction so as to detachably affix the water box in at least one of a frictionally and a geometrically interlocking manner in the detent cavity, and
    wherein at least one detent element projects into the detent cavity at an acute angle relative to the insertion direction such that the resilient leg is elastically deformed to a greater extent during an extraction of the rib of the water box from the detent cavity than during an insertion of the rib of the water box into the detent cavity so as to facilitate inserting the rib of the water box into the detent cavity in the insertion direction and present a greater resistance to extracting the rib from the detent cavity in an extraction direction opposite the insertion direction.

11. The sealing system as claimed in claim 10, wherein the at least one detent element constitutes a barb.

12. The sealing system as claimed in claim 10, wherein an engagement aperture into the detent cavity is delimited in the insertion direction by a free end of the resilient leg and a protrusion disposed between the first and second segments, the at least one detent element projecting into the detent cavity from one of the rib of the water box, the resilient leg and an undercut disposed behind the protrusion in the insertion direction.

13. The sealing system as claimed in claim 10, wherein the at least one detent element projects into the detent cavity from a link-up region to a free longitudinal edge and increases in cross-section from a tapered zone to a curved or beak edge at the free longitudinal edge that is configured to engage with the rib of the water box in the at least one of a frictionally and geometrically interlocking manner.

14. The sealing system as claimed in claim 10, wherein, in an installed position of the water box, the curved or beak edge of the at least one detent element is configured to rest in the geometrically interlocking manner in an undercut of the rib of the water box.

15. The sealing system as claimed in claim 10, wherein at least one of the first segment and the second segment include a reinforcing insert.

16. The sealing system as claimed in claim 10, wherein at least one of the first segment and the second segment is formed by extrusion.

17. The sealing system as claimed in claim 10, wherein the first segment has a U-shape so as to be affixable to a bottom of the vehicle window from an outer surface around the bottom to a back side of the vehicle window.

18. The sealing system as claimed in claim 10, wherein the first segment includes a seal configured to be disposed between an outer surface of the vehicle window and the water box in an installed state of the water box.

\* \* \* \* \*